United States Patent
Colimon et al.

(10) Patent No.: US 9,569,749 B2
(45) Date of Patent: Feb. 14, 2017

(54) METHOD AND SYSTEM FOR INVENTORY MANAGEMENT SYSTEM

(71) Applicants: Karl Harry Colimon, Fort Lauderdale, FL (US); Ulrick Belmont, Jr., Cape Coral, FL (US)

(72) Inventors: Karl Harry Colimon, Fort Lauderdale, FL (US); Ulrick Belmont, Jr., Cape Coral, FL (US)

(*) Notice: Subject to any disclaimer, the term of this patent is extended or adjusted under 35 U.S.C. 154(b) by 0 days.

(21) Appl. No.: 14/791,561

(22) Filed: Jul. 6, 2015

(65) Prior Publication Data
US 2017/0011334 A1    Jan. 12, 2017

(51) Int. Cl.
*G06Q 30/00* (2012.01)
*G06Q 10/08* (2012.01)
*G06K 19/06* (2006.01)
*G06F 17/30* (2006.01)

(52) U.S. Cl.
CPC ....... *G06Q 10/087* (2013.01); *G06F 17/30595* (2013.01); *G06K 19/06037* (2013.01)

(58) Field of Classification Search
CPC ...... G06Q 10/10; G06Q 10/06; G06Q 10/087; G06Q 10/063; G06Q 10/0631; G06Q 10/06313; G06Q 10/20; G06Q 20/10; G06Q 30/0222; G06Q 30/0283; G06Q 30/04; G06Q 30/0601; G06Q 40/00; G06Q 40/04; G06Q 40/12; G06Q 40/123; G06Q 40/125

USPC ................................................... 235/383, 385
See application file for complete search history.

(56) References Cited

U.S. PATENT DOCUMENTS

| | | | | |
|---|---|---|---|---|
| 8,807,421 B2* | 8/2014 | Johnson | ................ | G06Q 30/02 235/375 |
| 2013/0036059 A1* | 2/2013 | Oura | ................... | G06F 21/6218 705/71 |
| 2013/0299569 A1* | 11/2013 | Gentile | ................. | G06Q 10/08 235/375 |
| 2014/0129305 A1* | 5/2014 | Frame | ................ | G06Q 30/0207 705/14.13 |
| 2014/0164439 A1* | 6/2014 | Gale | .................... | G06F 19/322 707/803 |

* cited by examiner

*Primary Examiner* — Seung Lee
(74) *Attorney, Agent, or Firm* — Dunlap Bennett & Ludwig PLLC

(57) ABSTRACT

The present invention discloses a computer-implemented method for inventory management system including a plurality of products associated with Quick Reference (QR) codes. The method scans the QR code of a product via a scanning device being operated by a user. The method then receives an input code from the user for the corresponding QR code. The user input code is stored in a relational database and associated with the QR code in the inventory management system. The association of the user input code with QR code enables the user to locate various products in the inventory by searching with the user input code rather than the QR code. The user generated input code can be shared with other devises utilizing the same application.

11 Claims, 5 Drawing Sheets

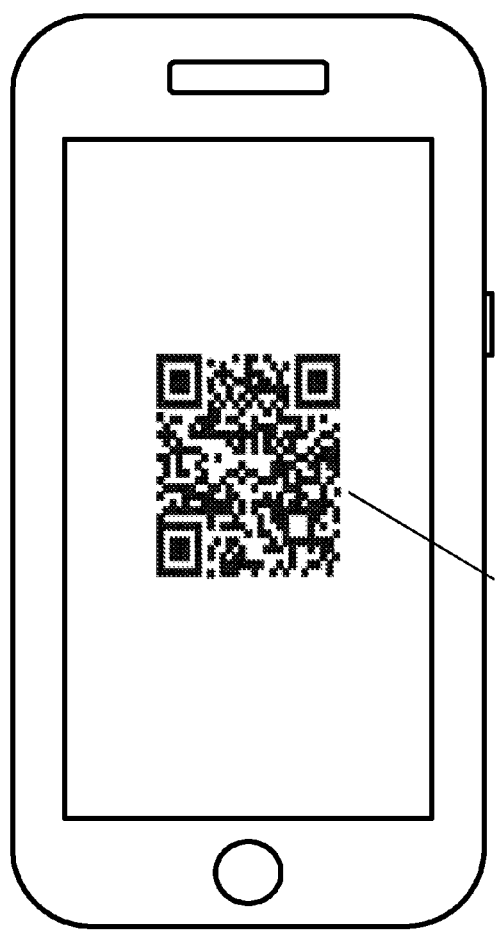
Fig. 5a                                  Fig. 5b

METHOD AND SYSTEM FOR INVENTORY MANAGEMENT SYSTEM

FIELD OF THE DISCLOSURE

The field of the present invention relates generally to systems and methods for efficient managing of inventory management systems. More specifically, the system and method relate to providing more secure and flexible inventory management system.

BACKGROUND OF THE DISCLOSURE

Inventory management system relates to the process of managing and locating objects with the help of software. The inventory management system relies upon barcodes and radio frequency tags to provide automatic identification of inventory objects.

QR or quick response code is one popular method which is used in Inventory management system. QR code uses numeric, alphanumeric, byte/binary etc. as its standardized encoding modes. Any kind of textual information, like web address, contact, code etc, can be encoded in a QR code. Once the encoding is done, the QR code is published on paper or any other physical support. Any scanning device, dedicated or otherwise can perform the scanning and decode the information in the QR code.

The mobiles with help of QR app can read the QR code. The QR code can officially contain thousands of characters, however, upper limit of hundred characters is recommended in a QR code. This is because, if more data is encoded then the QR code grows in size and the mobile camera resolution can't really handle the larger codes.

Current applications for Quick Reference (QR) codes utilize the data storing capability of the QR code to house web URL's or product information. Although, this has proven to be a very useful application of QR technology it is limited by the amount of data that can be held on the QR. In addition, any scanner or mobile device equipped with the right software can read the data on the QR code. The current devices are limited in the amount of data that can be stored as well as the level of security of that data. The current use does not address the need for the categorizing of unique items such as gemstones, prepared foods, works of art and the like, and the security and privacy of the embedded data. The amount of data stored on labels is limited by the size of the 2 dimensional codes.

As can be seen, there is a need for a flexible and secure inventory management system that allows assigned customized data to the QR code with encryption.

In addition to the above mentioned problem, any scanner or mobile device equipped with the right software can read the data on the QR code. This makes the security of the code vulnerable.

In the light of the above mentioned problems, there is a need for a flexible and secure inventory management system that allows the assigned customized data to the QR code with encryption.

SUMMARY OF THE DISCLOSURE

In view of the foregoing disadvantages inherent in the prior-art and the needs as mentioned above, the general purpose of the present disclosure is to provide a system and method for searching lost contacts in a mailbox of a user that is configured to include all advantages of the prior art and to overcome the drawbacks inherent in the prior art offering some added advantages.

To achieve the above objectives and to fulfill the identified needs, in one aspect, the present invention provides a computer implemented method for inventory management system comprising a plurality of products associated with Quick Reference (QR) codes, the method being capable of providing flexible and secure inventory management, the computer implemented method comprises scanning the QR code of a product via a scanning device being operated by a user, receiving an input code from the user for the corresponding QR code, storing the said user input code in a relational database and associating the said user input code with the said QR code in the inventory management system. This association of the input code enables the user to locate various products in the inventory by searching with the said user input code rather than the QR code.

In an aspect of the present invention, the receiving of the user input code includes assigning a value to the QR code such that the value is taken from the relational database.

In an aspect of the present invention, there is present a logic engine for allowing a user to change the assigned value to the QR code.

In an aspect of the present invention, the logic engine is capable of linking or delinking the user input code with the QR code.

In yet another aspect of the present invention, a system for inventory management inventory management system comprising a plurality of products associated with Quick Reference (QR) codes, the system being capable of providing flexible and secure inventory management, the system includes a computing device, a scanning device and a processing unit for carrying out the steps of scanning the QR code of a product via a scanning device being operated by a user, receiving an input code from the user for the corresponding QR code, storing the said user input code in a relational database and associating the said user input code with the said QR code in the inventory management system.

In yet another aspect of the present invention, the computing device is at least one of smart phone, a desktop computer, a laptop and the like.

In yet another aspect of the present invention, the scanning device is at least one of scanner and smart phones.

This together with the other aspects of the present invention along with the various features of novelty that characterized the present disclosure is pointed out with particularity in claims annexed hereto and forms a part of the present invention. For better understanding of the present disclosure, its operating advantages, and the specified objective attained by its uses, reference should be made to the accompanying descriptive matter in which there are illustrated exemplary embodiments of the present invention.

BRIEF DESCRIPTION OF THE DRAWINGS

The advantages and features of the present disclosure will become better understood with reference to the following detailed description and claims taken in conjunction with the accompanying drawing, in which:

FIGS. 4, 5a and 5b illustrate and exemplary example of implementation of the present invention.

Like numerals refer to like elements throughout the present disclosure.

DETAILED DESCRIPTION OF THE DISCLOSURE

The foregoing descriptions of specific embodiments of the present disclosure have been presented for purposes of illustration and description. They are not intended to be exhaustive or to limit the invention to the precise forms disclosed, and obviously many modifications and variations are possible in light of the above teaching. The exemplary embodiment was chosen and described in order to best explain the principles of the invention and its practical application, to thereby enable others skilled in the art to best utilize the invention and various embodiments with various modifications as are suited to the particular use contemplated.

The terms "a" and "an" herein do not denote a limitation of quantity, but rather denote the presence of at least one of the referenced item.

The terms "having", "comprising", "including", and variations thereof signify the presence of a component.

The term "inventory management system" relates to computer based system for tracking inventory levels, orders, sales and deliveries.

The present invention relates to a computer implemented method for an inventory management system for providing more secure and flexible technique for searching and tracking the inventory in the system. Additionally, the present invention also provides more security to the labels on various products. The said system and method will now be explained in conjunction with FIG. 1-5.

It will be apparent to a person skilled in the art that QR codes are machine-readable code consisting of an array of black and white squares, typically used for storing URLs or other information for reading by the camera on a smartphone or by a scanner in certain scenarios.

Figure 1:
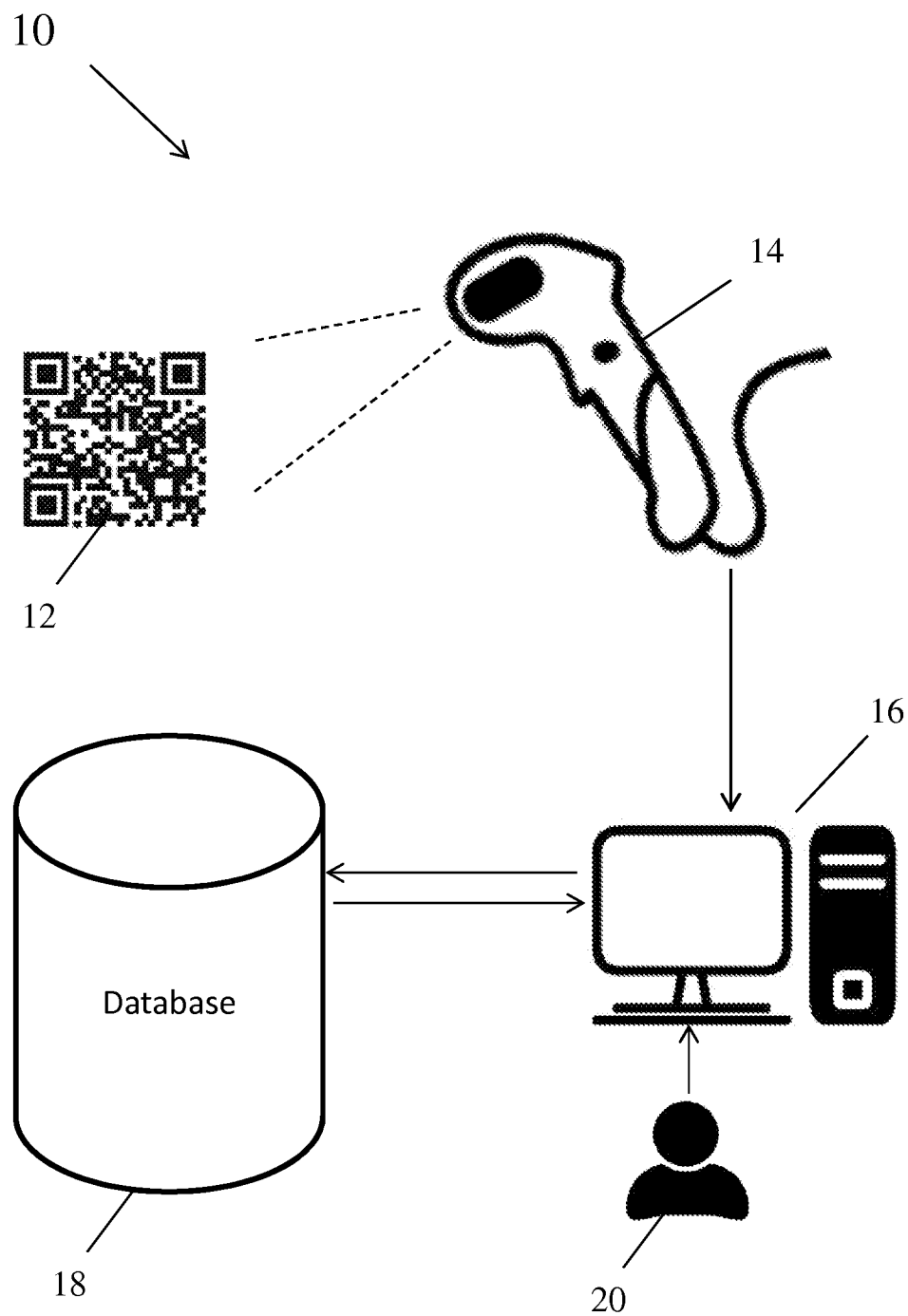
FIG. 1 illustrates an environment for the implementation of the present invention according to various embodiments of the present invention.

FIG. 1 of the accompanying drawings provides an environment 10 of the implementation of the present invention. QR code 12 is being scanned by a scanner 14. Once the scanning is complete, the QR codes are stored in a computing device 16. Thereafter, a user 20 provides an input via the computing device 16 such that the said user input code is stored in the database 18 on the computing device 16. This database is a relational database for storing the user input. The methodology and working of the computer implemented method is explained with FIGS. 2 and 3.

Figure 2:
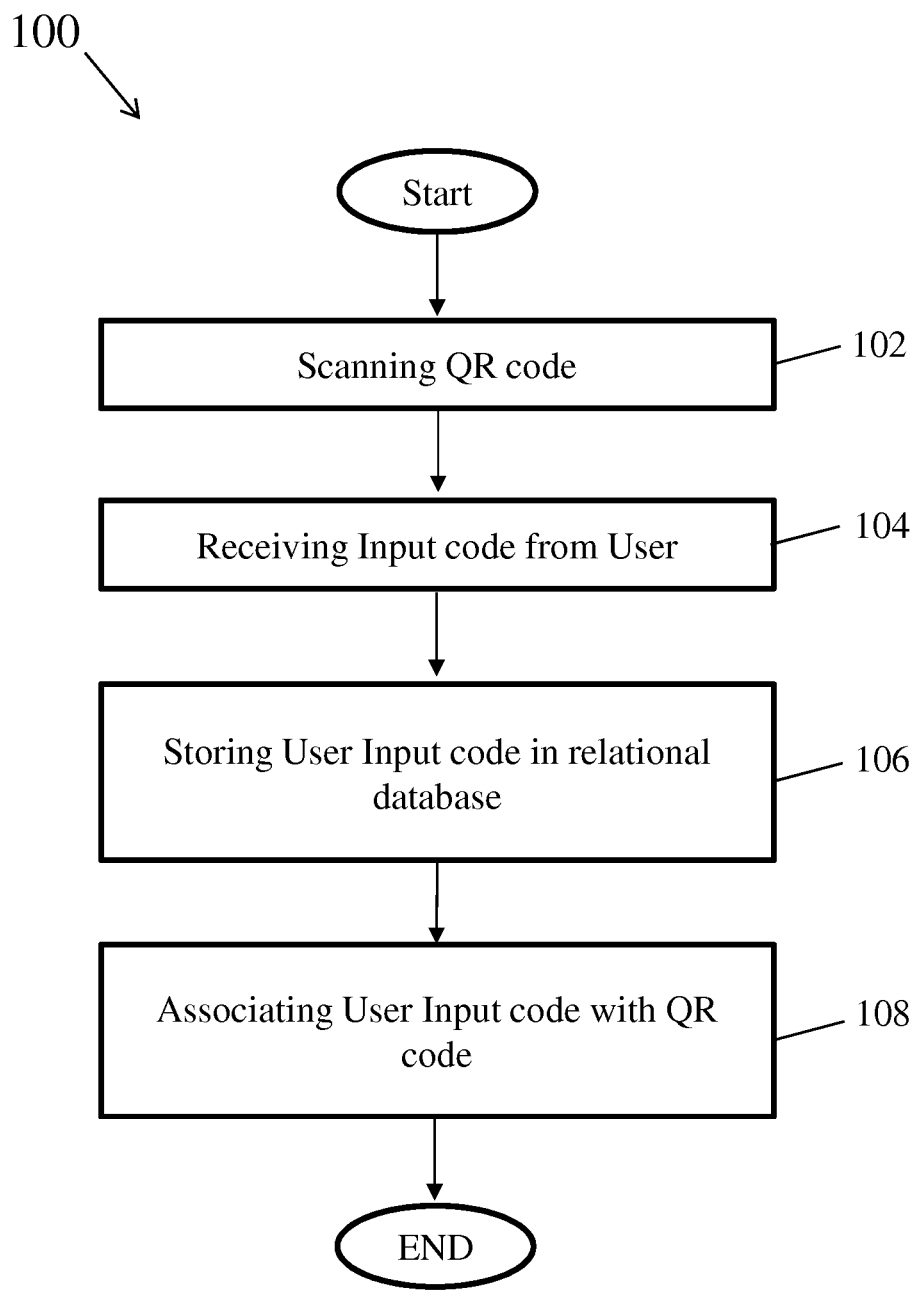
FIG. 2 illustrates a flow chart for showing a method of the present invention for scanning a QR code and assigning a value to the QR code.

Referring to FIG. 2, a method 100 with reference to an embodiment of the present invention. At step 102, a QR code present on a product or a plurality of products is scanned by a user using a scanner or via the camera of a smart phone. The QR code being scanned at this step of a method is preprinted on a product or plurality of products. Thereafter the method moves to step 104 where the system receives an input from a user. The input is provided via a computing device or a smart phone. This receiving of input means assigning a value to the already scanned QR code at step 102 of the method 100. Once the user input is received, the said user input code is stored in a relational database. This relational database is maintained in the user computing device or on a server depending upon the user's implementation of the present invention. The inventory management system as disclosed in the present invention may be implemented on a standalone computer or may be on a server depending upon the requirements of the user. Once the user input is stored in the database, the method 100 includes a step of associating the user input code with the scanned QR code at step 108.

In an embodiment of the present invention, in the system and method, there is provided a logic engine working at the backend for associating the user input code with the scanned QR code. The logic engine is capable of linking and delinking the user input code with the scanned QR code.

In an embodiment of the present invention, the logic engine is adapted to allow users to change assigned value to a particular QR code.

In yet another embodiment of the present invention, logic engine is adapted to allow users to personalize the data displayed by the random key.

This application of the technology may allow for customization such as but not limited to personal messages, personal offers, changing content of items in a container and the like.

This assigning of value to the scanned QR code enhances the security and flexibility of the inventory management system.

Figure 3:
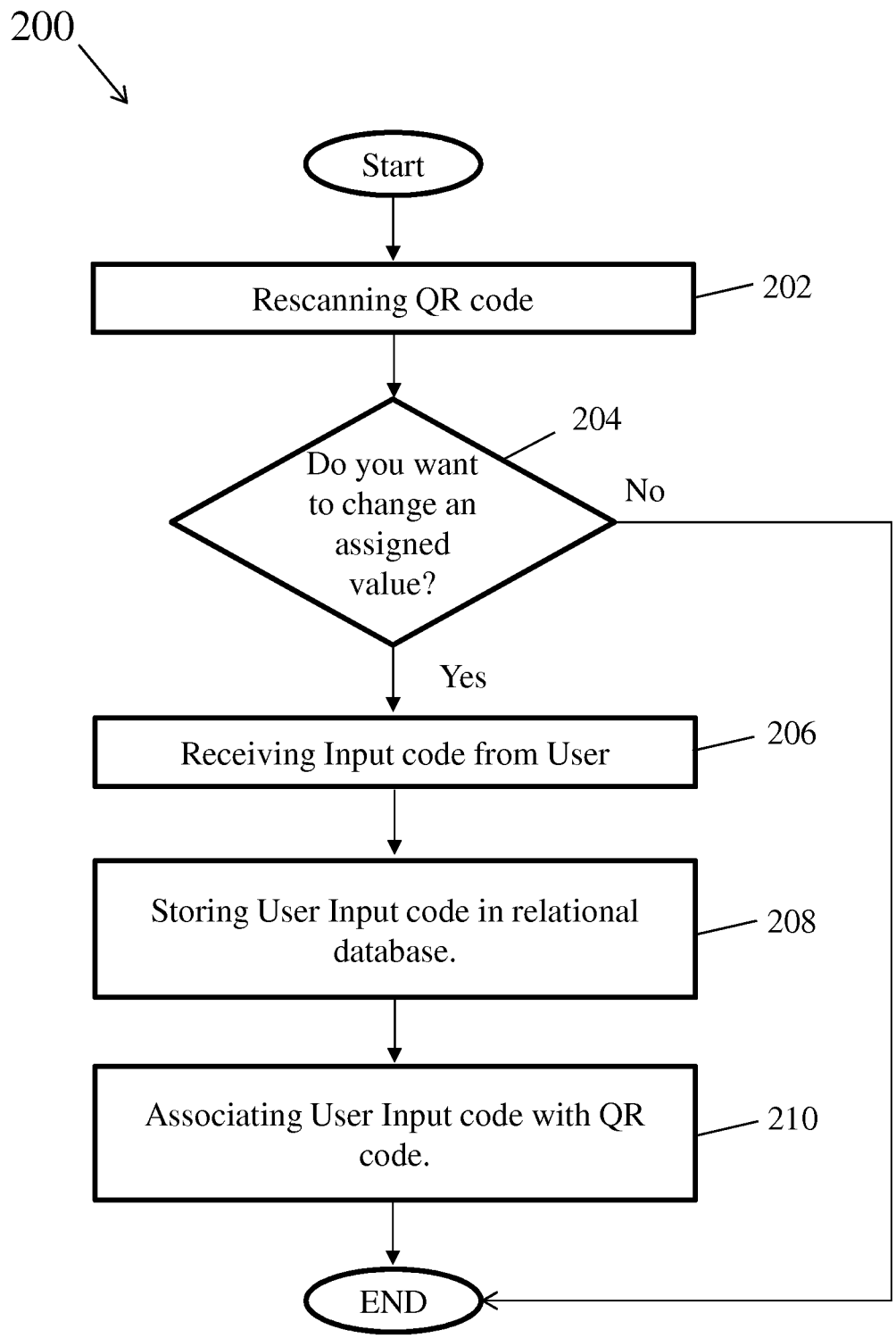
FIG. 3 illustrates a flow chart for showing a method of the present invention for rescanning a QR code and prompting the user to change the assigned value if required.

In another embodiment of the present invention, referring to FIG. 3, a rescanning of the codes is performed at step 202 of the method 200. Once the rescanning is done, the data shown contains the assigned value as assigned at step 104 of method 100.

In another embodiment of the present invention, at step 204, the system prompts the user if he wants to change the previously assigned value or not. If to the affirmative then the method 200 follows the steps of receiving the user input at step 206, storing the user input in the relational database at step 208 and associating the assigned value or the user input with the scanned code at step 210.

At step 204, if the decision is "NO" then the method terminates.

Figure 4:
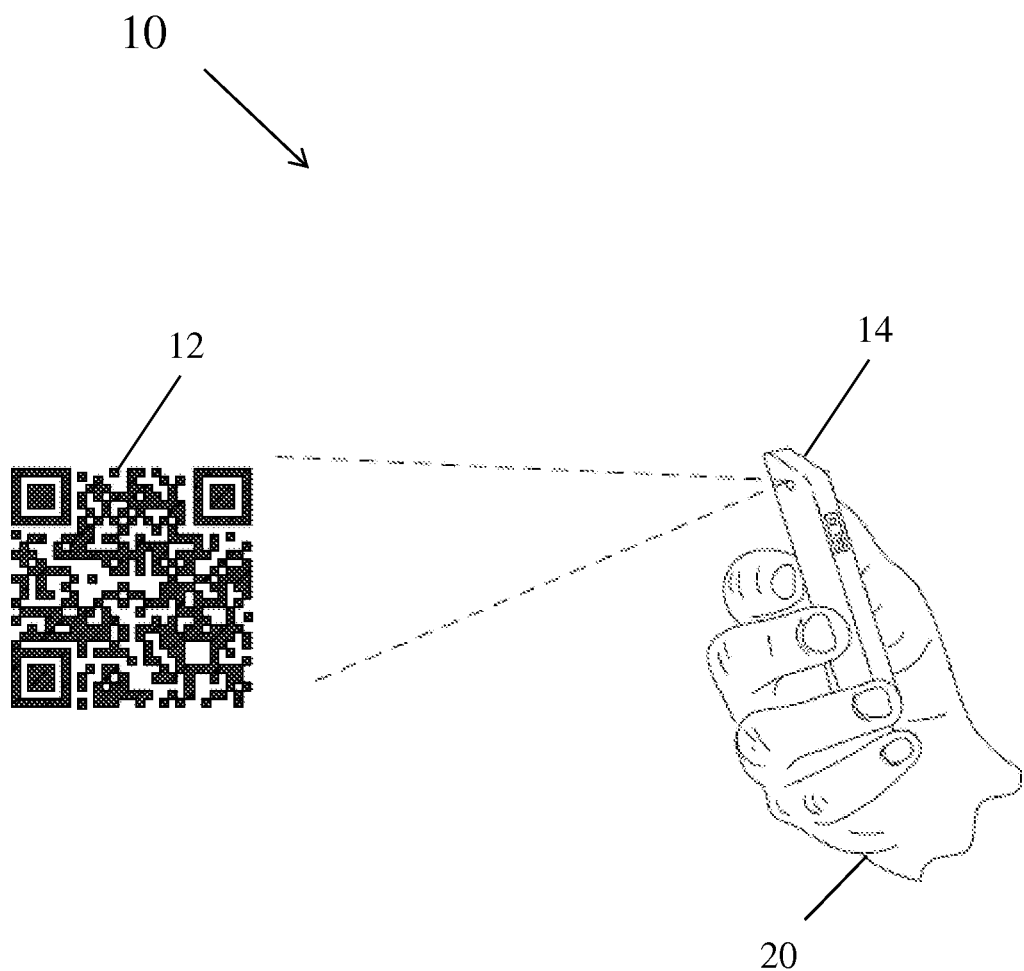

In an exemplary embodiment of the present invention, an implementation of the method is illustrated in FIGS. 4 and 5. In FIG. 4, a user 20 scans the QR code 12 with his device 14. In an aspect, the QR code 12 is a two dimensional black and white graphic image that is capable of storing information.

In various embodiments of the present invention, the device 14 is a smart phone enabled with camera, a barcode scanner or any other scanning device. FIG. 5a illustrates the code 12 in the device 14 after it has been scanned. FIG. 5b illustrates the user 20 being presented the option of inputting user data. As illustrated, the user 20 is provided with "Choose A Category From The List Below To Start Your Record" option on the device 14. After selecting the desired category, the relational database is updated and the user input code is associated with the QR code 12.

The present method thus can be used to inventory personal items such as, but not limited to, medication, medical record tracking, identifying medical conditions through labels affixed to wearable items, tracking medical interactions, and side effects. The method can also be used in promotional campaigns, to send personalized offers, help track users consumption habits.

As an example for implementation of the present invention, suppose a person purchases food from a takeout restaurant and would like to know nutritional information about that item when he purchased it, and how much he paid, all of that information are linked to the QR and can be retrieved from the application.

In addition, if a person purchases medication, nutritional supplements, vitamins from a local pharmacy, a customer or pharmacist can label all items regardless and send refill reminders or other pertinent information.

In certain embodiments, the present method can be used in the promotion of music, by linking the reference code to personalized song associated with the code. By leveraging the relationship of the present computer implemented method a retailer can create a promotional campaign by placing a single code as a display in a retail location and having customers scan the code with a mobile device and offering individualized offers or message to each user. The user can create an individualized private message that can only be retrieved by scanning the code.

Further, the present invention restricts other unknown or unauthenticated devices from scanning and retrieving the information related to the QR code. Hence, the present invention adds a security layer to the inventory management system.

Considering the disclosed teachings of the present invention, it is concluded that the invention finds wide applicability in the field of inventory management system. The present invention may leverage the abilities of the Quick Reference Code (QR) of holding a large amount of data in order to embed an encryption key, comprised of unique alphanumeric identifiers on preprinted QR codes. This in turn, allows a user to scan the QR code and associate a set of unique information, such as, but not limited to, prescription drug information, food, personal data, medical records, sensitive record tracking, secure messages etc. The code may be permanently linked with the user-defined data, in order to securely tag and categorize user-defined items. The code can be scanned via a mobile device including but not limited to smart phones, tablet, scanner and any properly equipped digital reader. Subsequent scans of the QR code in combination of user name and password and the like provide more security while accessing the information.

The present invention can be implemented as an application on a smart device. The present invention can be accessed by the computer using a web browser. The computer ca access the present invention via the web browser using the internet, extranet, intranet, host server, internet cloud and the like.

The system, as described in the disclosed teachings or any of its components, may be embodied in the form of a computer system. Typical examples of a computer system include a general-purpose computer, a PDA, a cell phone, a programmed microprocessor, a micro-controller, a peripheral integrated circuit element, and other devices or arrangements of devices that are capable of implementing the steps that constitute the method of the disclosed teachings.

The computer-based data processing system and method described above is for purposes of example only, and may be implemented in any type of computer system or programming or processing environment, or in a computer program, alone or in conjunction with hardware. The present invention may also be implemented in software stored on a computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer.

In a computer system comprising a general-purpose computer, such may include an input device, and a display unit. Specifically, the computer may comprise a microprocessor, where the microprocessor is connected to a communication bus. The computer may also include a memory. The memory may include Random Access Memory (RAM) and Read Only Memory (ROM). The computer system further comprises a storage device, which can be a hard disk drive or a removable storage drive such as a floppy disk drive, optical disk drive, and the like. The storage device can also comprise other, similar means for loading computer programs or other instructions into the computer system.

The computer system may comprise a communication device to communicate with a remote computer through a network. The communication device can be a wireless communication port, a data cable connecting the computer system with the network, and the like. The network can be a Local Area Network (LAN) or a Wide Area Network (WAN) such as the Internet and the like. The remote computer that is connected to the network can be a general-purpose computer, a server, a PDA, and the like. Further, the computer system can access information from the remote computer through the network.

It is further contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatus configured to implement the method are within the scope of the present invention.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, and to thereby enable others skilled in the art to best utilize the present invention and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the spirit or scope of the present invention.

What is claimed is:

1. A computer implemented method for inventory management system comprising a plurality of products associated with Quick Reference (QR) codes, the method being capable of providing flexible and secure inventory management, the computer implemented method comprising:

scanning the QR code of a product via a scanning device being operated by a user;

receiving an input code from the user for the corresponding QR, assigning a value to the QR code such that the value is taken from a relational database, storing the said user input code in the relational database;

associating the said user input code with the said QR code in the inventory management system, wherein such association of the input code enables the user to locate various products in the inventory by searching with the said user input code rather than the QR code;

prompting the user to change the assigned value to the QR code via a logic engine capable of linking or delinking the user input code with the QR code.

2. The method of claim 1, further comprising:

restricting an unknown or an unauthenticated device from scanning and retrieving the information related to the QR code.

3. An inventory management system comprising a plurality of products associated with Quick Reference (QR) codes, the system being capable of providing flexible and secure inventory management, the system comprising:

a computing device;

a scanning device; and a processing unit for carrying out the steps of scanning the QR code of a product via a scanning device being operated by a user;

receiving an input code from the user assigning a value taken from a relational database for the corresponding QR code, storing the said user input code in a relational database; and associating the said user input code with the said QR code in the inventory management system, wherein such association of the input code enables the user to locate various products in the inventory by searching with the said user input code rather than the QR code; and a logic engine which allows the user to change the assigned value to the QR code.

4. The system as claimed in claim 3, wherein the computing device is at least one of smart phone, a desktop computer, a laptop and the like.

5. The system as claimed in claim 3, wherein the scanning device is at least one of scanner and smart phone.

6. The system as claimed in claim 3, wherein the computing device is a server.

7. The system as claimed in claim 3, wherein the logic engine is capable of linking or delinking the user input code with the QR code.

8. The system of claim 3, further comprising:

restricting an unknown or an unauthenticated device from scanning and retrieving the information related to the QR code.

9. A computer program product for inventory management system comprising a plurality of products associated with Quick Reference (QR) codes, the method being capable of providing flexible and secure inventory management, the computer program product comprising executable instructions which, when executed by one or more processors, cause the one or more processors to carry out the steps of:

scanning the QR code of a product via a scanning device being operated by a user;

receiving an input code from the user assigning a value taken from a relational database for the corresponding QR code, storing the said user input code in a relational database; and associating the said user input code with the said QR code in the inventory management system, wherein such association of the input code enables the user to locate various products in the inventory by searching with the said user input code rather than the QR code; and prompting the user to change the assigned value to the QR code via a logic engine.

10. The computer program product as claimed in claim 9, wherein the logic engine is capable of linking or delinking the user input code with the QR code.

11. The computer program product as claimed in claim 9 further comprising:

restricting an unknown or an unauthenticated device from scanning and retrieving the information related to the QR code.

\* \* \* \* \*